Figures 2, 3:
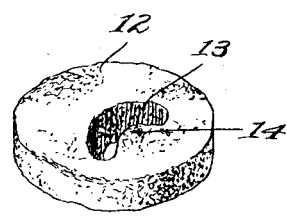

J. B. KIRBY.
LUBRICATING DEVICE.
APPLICATION FILED SEPT. 8, 1913.
1,182,092.  Patented May 9, 1916.
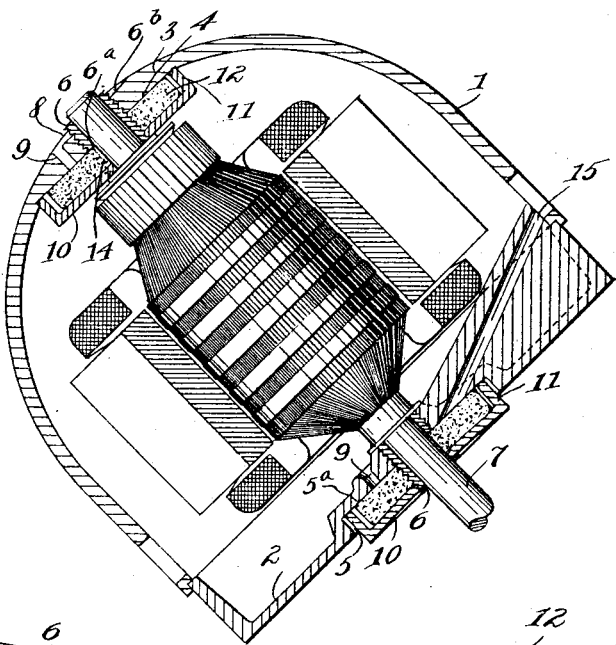
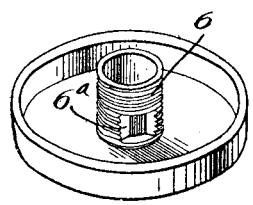

Fig. 4.
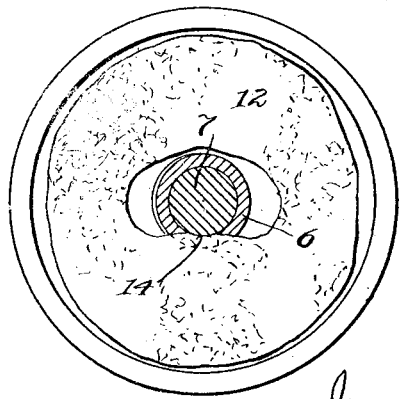
WITNESSES:
Robert L. Buck.
Hugh B. McGill.
INVENTOR.
James B. Kirby
By Hull & Smith
ATTYS.

UNITED STATES PATENT OFFICE.

JAMES B. KIRBY, OF CLEVELAND, OHIO.

LUBRICATING DEVICE.

1,182,092.   Specification of Letters Patent.   Patented May 9, 1916.

Application filed September 8, 1913. Serial No. 788,555.

*To all whom it may concern:*

Be it known that I, JAMES B. KIRBY, a citizen of the United States, residing at Cleveland, in the county of Cuyahoga and State of Ohio, have invented a certain new and useful Improvement in Lubricating Devices, of which the following is a full, clear, and exact description, reference being had to the accompanying drawings.

This invention relates to lubricating devices and more particularly to such devices as are employed for the purpose of applying lubricant gradually and economically to the bearings of shafts.

While certain features of the devices are of more general application, the device in its details was designed with particular reference to use in connection with the shafts of high speed motors such as are employed in electrically operated vacuum cleaning machines, although capable of use in any location whatever.

It is the general object of the invention to provide a lubricating device which is particularly convenient of application to and of removal from the associated parts which are to be lubricated; which not only will remain in place when inserted, but will also assist in retaining its coöperating member in place; which is economical of production as well as economical in operation and which is extremely efficient in operation, requiring infrequent renewal of any of the parts thereof and particularly of the absorbent washer or pad by which the lubricant is distributed to the bearings; which shall exert a minimum of friction upon the shaft to which it is applied; which shall contain a large amount of lubricant at one time, and in which the danger of dripping or spilling oil shall be a minimum.

With the foregoing general objects in view the invention may be defined further as consisting of the combinations of elements embodied in the claims annexed hereto and illustrated in the drawings forming part hereof, wherein—

Figure 1 represents a longitudinal sectional view through a motor and its casing having my lubricating device applied thereto; Fig. 2 is a sectional detail, showing the lubricating cup in plan, the coöperating parts of the shaft and bushing being shown in cross section; Fig. 3 is a perspective view of the cup and the bushing to which it is applied, the absorbent pad or washer being removed; and Fig. 4 is a perspective view of the pad or washer.

Describing by reference characters the various parts illustrated herein, 1 and 2 denote the sections of a motor casing. The section 1 of the casing here shown has a rounded or spherical end, the wall thereof being thickened, as shown at 3, and faced off on the inside around the shaft-bearing aperture to form a seat, as shown at 4. The other section 2 is recessed about the shaft as shown at 5, the bottom $5^a$ of the recess forming a seat; the central portion of the recess is provided with a shaft bearing aperture in alinement with the aperture in the other section.

The apertures in the casing sections 1 and 2 are threaded for the reception of the bushings 6 and through these bushings the motor shaft 7 extends. Each of these bushings is provided with a slot $6^a$, the parts being so proportioned that, when the bushings are in place, the outer end of a bushing in the casing section 1 will project a short distance beyond the outer surface of said section (as shown at $6^b$) and the slot of said bushing will be within the casing, while the slot in the other bushing will be outside of the casing section 2.

Reference has been made to the fact that the motor may be the motor of a vacuum-cleaning machine, and such a motor and its casing are shown herein, the motor being in the inclined position, which it generally assumes when operating on such a machine. The upper section 1 is provided with an oil channel 8 extending downwardly from the bushing and communicating with the oil hole 9, through which the oil may be supplied from time to time to the interior of the cup. Each cup has a bottom 10, which is provided with an internally threaded aperture whereby it may be threaded upon and carry a bushing 6, and with a flange or wall 11 projecting at right angles therefrom and constituting the side of the cup. The wall of each cup engages the corresponding casing section at a distance from the bushing and holding it in line, while the fact that the cup is threaded to the bushing causes it to act as a lock nut and thus prevent any loosening or shifting of the bushing. When in place, the upper edge of the wall 11 engages, in one case, the seat 4 in the casing section 1 and, in the other case, the bottom wall $5^a$ of the recess 5 in the casing section 2. These cups are preferably of spring metal, whereby, when their upper edges or rims are brought into close or biting engagement with the seats 4 and 5ª, they are placed under tension and operate as lock nuts to retain themselves as well as their respective bushings in place.

Within each of the lubricating cups there is placed a body or pad 12 of absorbent material, said pad having a crescent-shaped slot 13 in the central portion thereof which is adapted to receive therewithin a bushing 6 and shaft 7, with the tongue or projection 14 extending into the slot 6ª and bearing against the shaft, as will clearly appear from Figs. 1 and 2. Oil may be supplied to these pads from time to time, through the opening 9 in the upper casing section and through the channel 15 in the lower section.

It will be noted that the absorbent pads are of smaller diameter than the internal diameter of their respective cups whereby any adjustment of a cup on its bushing will not move the tongue or projection 14 out of the bushing slot through frictional engagement between the cup wall 11 and the peripheral portion of the pad. Also the engagement of the opposite side of the bushing with the opposite side of the pad-aperture will hold the tongue securely within its slot.

In operation, oil will flow by capillary action between each bushing 6 and the shaft, will overflow the projecting end of the bushing, and will flow around such end into the channel 8 and thence through the oil hole 9 back into the cup, thus avoiding dripping and saving oil.

Among the advantages of my construction are its cheapness; the operation of the cup as a lock nut, the cup being of spring metal and being placed under tension by threading it tightly against its appropriate casing seat; its economy in oil consumption; and the practical indestructibility of the pad, which is subjected only to the friction of the shaft as it turns against the projection or tongue 14. Also, if the cups be made of steel and the casing members of aluminum it will be found that the ordinary tightening up of the cups will cause them to indent the softer metal sufficiently to obviate any possible leakage.

It is an important feature of my lubricating devices from a manufacturing standpoint that all of the parts are concentric, thus rendering them more easy to make.

I have shown the pad inclosed devices formed chiefly of separate members called cups, but it will be obvious that these receptacles could be made in other ways as by recessing the casing members themselves and employing the added member merely as a cover. Likewise many other details of construction and arrangement could be modified without departure from my inventive idea, as will be apparent to those skilled in the art.

Having thus described my invention, what I claim is:—

1. In a device of the character described, the combination of a hollow cylindrical bushing having an aperture in one of its walls, a cup surrounding said bushing, and an annular pad of absorbent material in said cup and having a tongue projecting through said aperture, the normal internal diameter of said pad being not larger than the diameter of said bushing.

2. In a device of the character described, the combination of a bushing having an aperture in its wall and an annular absorbent body surrounding said bushing, said body having at one side an internal tongue projecting into said aperture and snugly engaging said bushing at a point opposite said tongue.

3. In a device of the character described, the combination of a bushing having an aperture in the wall thereof, a cup on said bushing, and an annular pad of absorbent material within the cup and surrounding the bushing and having an internal tongue projecting into said aperture, the aperture in said pad being not larger than the external diameter of said bushing, and the external diameter of said pad being less than that of the cup.

4. In a device of the character described, the combination of a one-piece bushing having an aperture in the wall thereof, a receptacle surrounding said bushing and substantially concentric therewith, said aperture communicating with the interior of said receptacle, and an annular pad of absorbent material within said receptacle and surrounding said bushing and having a portion projecting into said aperture, the diameter of the opening through the pad being such that said portion is drawn positively into said aperture.

5. In a device of the character described, the combination of a bushing provided with an aperture at one place in its wall, a cup on said bushing, and an absorbent pad in said cup having an opening through which the bushing extends and provided with a tongue or projection extending into the aperture in the wall of said bushing, the pad being of less diameter than the internal diameter of said cup.

6. In a device of the character described, the combination of a bushing having an external thread and provided with an aperture in the wall thereof, a cup threaded on said bushing, and an absorbent pad in said cup and having an opening through which the bushing extends and provided with a tongue or projection extending into the aperture of said bushing.

7. In a device of the character described, the combination, with a supporting body having an aperture therein and a seat surrounding said aperture, of an externally threaded bushing in said aperture, and a cup threaded on said bushing and adapted to engage said seat with its rim.

8. In a device of the character described, the combination, with a supporting body having a threaded aperture, and a recess surrounding said aperture, of an externally threaded bushing in said aperture, and a cover member threaded on said bushing and engaging said casing at a distance from said aperture, and a body of absorbent material surrounding the bushing beneath said cover, said bushing being perforated to permit said body to touch the shaft therein.

9. The combination, with a supporting body having an internally threaded aperture, of a bushing threaded into said aperture and extending through said body, a cup on said bushing and having a rim adapted to engage said body at a point removed from a said bushing, and an absorbent pad in said cup and arranged to supply lubricant to the interior of the bushing.

10. The combination, with a supporting body having an aperture and a recess surrounding said aperture, of a bushing secured in said aperture and projecting through said recess and having a perforation in its wall, a cover member secured to said bushing and engaging the casing at a distance therefrom, the body having an oil hole communicating with said recess, an oil channel extending from the bushing to said oil hole, and an absorbent pad beneath said cover member and having a projection adapted to extend into the bushing perforation.

11. The combination, with a supporting body having an aperture and a seat surrounding said aperture, of a bushing threaded into said aperture and having an aperture in its wall, a cup adjustably connected to said bushing and adapted to engage the seat with its rim, the body having an oil hole extending to the interior of the cup and an oil channel extending from the bushing to said oil hole, and an absorbent pad within the cup adapted to supply oil to the bushing aperture.

12. The combination, with a supporting body having an aperture whose axis is generally upright, of a bushing in said aperture and projecting from the lower face of the body, the portion of the bushing below said body being provided with an aperture, a cup on said bushing below the body, an absorbent pad in said cup having a projection extending into the bushing aperture, the upper face of the body being provided with an oil hole extending therethrough and communicating with the interior of the cup, said body also having a channel extending from the upper end of the bushing to said oil hole.

13. In a device of the character described, a shaft supporting member having a threaded aperture, and a seat at a distance from said aperture and in a plane perpendicular to the axis of the aperture, an externally threaded bushing secured in said aperture, and an elastic disk screwed on said bushing and having a peripheral portion engaging said seat, said disk being screwed onto said bushing sufficiently to distort its center compared to its margin.

14. In a device of the character described, a bearing support having a threaded aperture and a flat circular seat formed as a surface of revolution concentric with said aperture, an externally threaded bushing adapted to be screwed into said aperture, and an elastic disk adapted to be screwed upon said bushing and having a rim adapted to engage said seat.

15. In a device of the character described, a bearing support having a threaded aperture and a circular seat formed as a surface of revolution concentric with said aperture, an externally threaded bushing adapted to be screwed loosely into said aperture, and a securing disk adapted to be screwed loosely upon said bushing and having a rim adapted to engage said seat.

In testimony whereof, I hereunto affix my signature in the presence of two witnesses.

JAMES B. KIRBY.

Witnesses:
HAROLD E. SMITH,
S. S. STOHLMAN.